United States Patent [19]

Greenleaf

[11] Patent Number: 4,598,973
[45] Date of Patent: Jul. 8, 1986

[54] APPARATUS AND METHOD FOR RECORDING AND DISPLAYING A THREE-DIMENSIONAL IMAGE

[76] Inventor: James F. Greenleaf, 1068 Plummer La., Rochester, Minn. 55901

[21] Appl. No.: 587,270

[22] Filed: Mar. 7, 1984

[51] Int. Cl.⁴ .............................................. G03H 1/06
[52] U.S. Cl. ..................................................... 350/3.6
[58] Field of Search ...................... 350/3.6, 3.67, 3.81, 350/3.64

[56] References Cited

U.S. PATENT DOCUMENTS

| 3,530,779 | 9/1970 | Alofs | 95/18 |
| 3,632,182 | 1/1972 | Sincerbox | 350/3.67 |
| 3,903,531 | 9/1975 | Yevick | 354/102 |
| 3,953,869 | 4/1976 | Wah Lo et al. | 354/115 |
| 4,086,585 | 4/1978 | Wah Lo et al. | 354/115 |
| 4,198,147 | 4/1980 | Alasia | 354/115 |
| 4,304,459 | 12/1981 | Kramer | 350/3.71 |
| 4,529,273 | 7/1985 | Gronin-Golomb et al. | 350/354 |
| 4,540,246 | 9/1985 | Fantone | 350/3.7 |

OTHER PUBLICATIONS

Hoffman, "Optical Information Storage in Three-Dimensional Media Using the Lippman Technique", Applied Optics, vol. 7, No. 10, 10–1968, pp. 1949–1954.
Waddell et al, "The Role of Retro-Reflective Materials in Holography," J. of Photographic Science, vol. 23, No. 2, Mar.-Apr. 1975, pp. 88-95.
The Wonder of Holography, National Geographic-Mar. 1984, pp. 364-377.

Primary Examiner—Bruce Y. Arnold
Assistant Examiner—B. S. Shapiro
Attorney, Agent, or Firm—Merchant, Gould, Smith, Edell, Welter & Schmidt

[57] ABSTRACT

An apparatus and method for recording and displaying a three-dimensional image is disclosed. A high resolution, thick film emulsion (50) is positioned in contact with a phase-conjugate mirror (60). The emulsion (50) is exposed to light from a light source (20) which is reflected off of a three-dimensional object (30). Upon exposure to the light from the light source (20) each ray of light (10) will transverse the emulsion (50) and be reflected from the phase-conjugate mirror (60) so as to exactly retrace its path back through the emulsion (50). The incident light waves (10') and their reflected light rays (70') will expose the emulsion (50) in the form of an interference pattern or wave form (80'). Once exposed, the emulsion (50) is developed in the customary manner. The developed emulsion (100) will pass only light rays of a frequency (color) and direction similar to that which the emulsion (50) was originally exposed. Accordingly, a three-dimensional image is displayed to the viewer (130).

15 Claims, 5 Drawing Figures

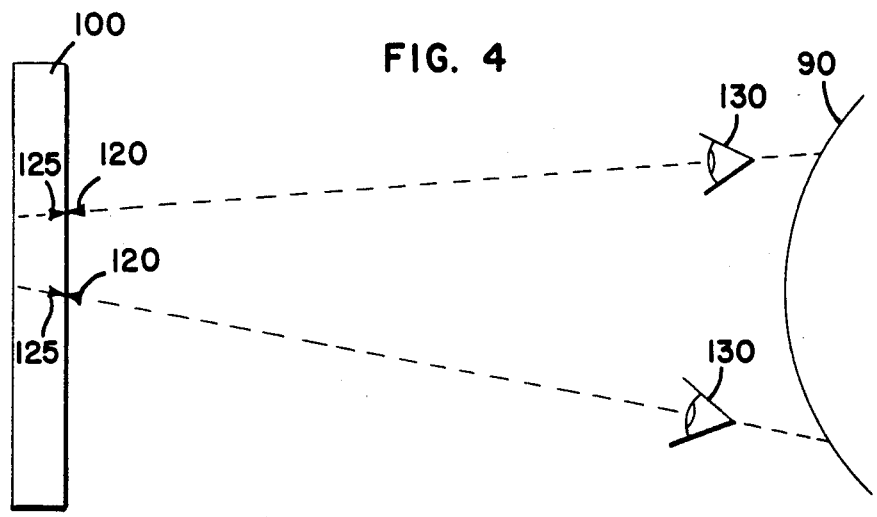
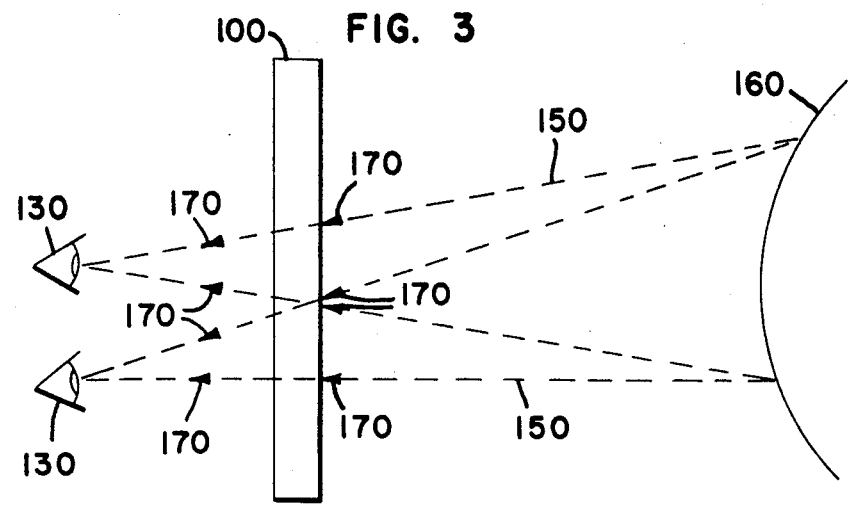
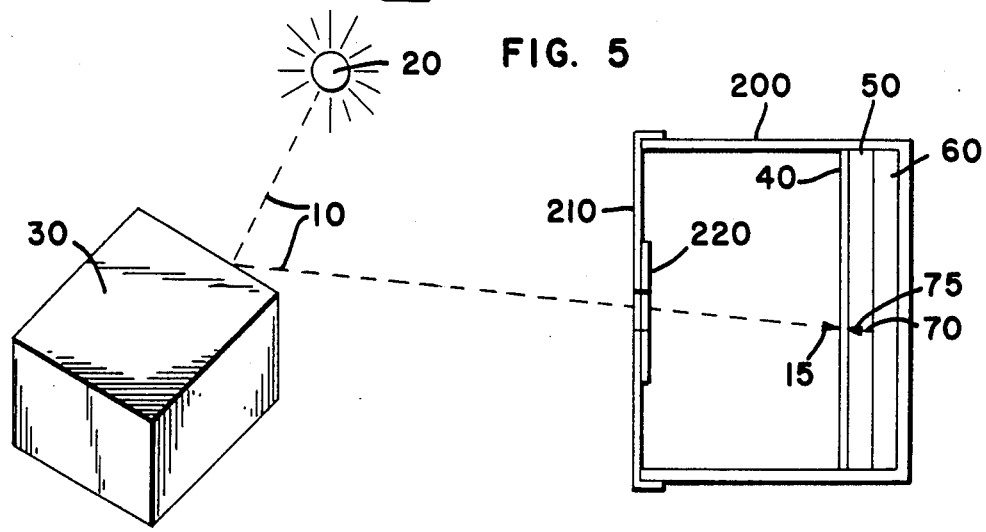

APPARATUS AND METHOD FOR RECORDING AND DISPLAYING A THREE-DIMENSIONAL IMAGE

BACKGROUND OF THE INVENTION

The present invention relates to an apparatus and method for recording and displaying a three-dimensional image. More particularly, the present invention relates to an apparatus and method which utilizes a phase-conjugate mirror in combination with an emulsion for recording and displaying a three-dimensional image.

In the past, three-dimensional images of an object have been generally recorded by one of two techniques: holography and stereoscopy. In conventional holography, coherent light, usually in the form of a laser beam, is reflected off of the object to be photographed. This reflected laser light and additional laser light from a reference beam are then used to expose a photographic emulsion. The image recorded in the emulsion is not the image of either the reflected laser or the reference laser light alone, but rather a record of the interference pattern formed by the two beams acting upon one another.

One primary disadvantage to holography has been lack of color. Attempts have been made to produce color effect by exposing the same emulsion to the interference patterns formed by lasers at several different frequencies, thereby producing a color image comparable to the color image on a television. However, unless the emulsion is exposed to all frequencies of light, the recorded color is at best an approximation of the true color. Attempts have also been made using white light, i.e., light containing all visible frequencies, but an extremely bright light is usually required and the images tend to be fuzzy.

Another disadvantage of holography is the requirement of dimensional stability between the emulsion, laser, and object which has precluded the use of such systems except in the most esoteric applications.

In stereoscopy, two cameras or a single camera with a split lens are held in spaced alignment with each other. To produce a three-dimensional effect, the developed image through one lens is somehow differentiated from the developed image through the other lens. The three-dimensional movies of the 1950's projected one image in one color and the other image in another color. The viewer then wore spectacles with two different colored lenses to separate the images. Unfortunately, true color is unobtainable using this technique. More recently, in the three-dimensional movies produced in the 1980's, polarization, instead of color, has been used to differentiate the two images. True color is possible using this technique, but the viewer must wear spectacles with lenses having different polarizations. Whether color or polarity is used to distinguish the images, stereoscopy has the disadvantage that the spacing of the cameras must be perfectly maintained and that the viewer must wear typically uncomfortable spectacles to create the three-dimensional effect.

With Lippman photography, fringes or interference fringes are generated when light is reflected by a mercury coating at the back of a special fine grained photographic emulsion; however, this does not provide a three-dimensional image.

Further developments using white light and more simple methods have not been successful in producing three-dimensional images.

The present invention solves these and many other problems associated with recording and displaying a three-dimensional image.

SUMMARY OF THE INVENTION

The present invention relates to an apparatus for recording a three-dimensional image of an object illuminated by a light source. The apparatus includes a housing having a front end and a back end. The housing supports a thick film emulsion and a phase-conjugate mirror, the emulsion being juxtaposed with and in front of the phase-conjugate mirror. The housing further includes means for retaining the emulsion in contact with the phase-conjugate mirror. Shutter means positioned proximate the front end of the housing provides for exposing the emulsion to the illuminated object for a predetermined period of time.

The present invention further relates to a method for recording a three-dimensional image. The method includes illuminating with a light source an object whose image is to be recorded. Light reflected off the object is passed through a photographic emulsion and is reflected directly back through the emulsion at its original angle of incidence by use of a phase-conjugate mirror. The photographic emulsion is then developed to record the three-dimensional image of the object in the emulsion.

The present invention further relates to a method for displaying a three-dimensional image which includes illuminating with a light source an object whose image is to be recorded and subsequently displayed. Light from the light source reflected off the object is passed through a photographic emulsion. The light passing through the emulsion is reflected directly back through the emulsion at its original angle of incidence by use of a phase-conjugate mirror. The photographic emulsion is developed and the developed emulsion is viewed by shining a light through the developed photographic emulsion, the developed photographic emulsion passing only light of like frequency and direction which previously exposed the photographic emulsion so as to generate a three-dimensional image.

The present invention further relates to an apparatus for displaying a three-dimensional image including a housing having a front end and a back end. The housing supports a developed thick film emulsion. A light source is provided for directing light through the developed emulsion from the front side thereof, the developed photographic emulsion reflects only light of frequency and direction corresponding to the recorded holographic image therein so as to generate a three-dimensional image to a viewer.

The present invention provides true color, three-dimensional images without the use of a separate or special reference beam. Rather, the present invention enables a normal white, diffuse, incoherent light source to be utilized. The present invention thus provides for relatively noncomplex and inexpensive three-dimensional photography for use by the general public.

Recently developed, phase-conjugate mirrors exhibit characteristics and behavior quite different from that of traditional mirrors. A traditional mirror will reflect light at an angle equal but opposite to the light's angle of incidence on the mirror. As a result, the only time a light beam is reflected directly back on itself is if it strikes the mirror perpendicularly. A phase-conjugate mirror, as defined in this application is any composition or arrangement of elements which reflects a light beam back along its incoming path, regardless of its angle of incidence on the mirror. In addition, the reflected beam is the phase-conjugate of the incident beam.

Currently, phase-conjugate mirrors are largely being used with lasers to concentrate light. The applicant has discovered that phase-conjugate mirrors may be utilized in an apparatus and method for recording and displaying three-dimensional images in a simple inexpensive manner for general usage. The applicant has discovered that by utilizing a high resolution, thick film emulsion in contact with a phase-conjugate mirror, a three-dimensional image can be recorded in the emulsion by exposing the emulsion to normal diffuse white light reflected off an object whose image is to be recorded. Upon exposure of the emulsion to diffuse white light, each light ray traverses the emulsion and is reflected from the phase-conjugate mirror so as to retrace its path back through the emulsion. The electric field of each light ray reflected back on itself sets up a standing wave in the emulsion exposing a phase filter which upon being developed, will pass only light rays of like frequency (color) and direction so as to provide a true color, three-dimensional image of the object without necessitating the use of a separate reference beam. In effect, the incoming reflected light acts as its own reference beam.

Some types of commercially available reflective tape, such as that made by 3M Company also exhibit somewhat limited phase-conjugate mirror characteristics. Such reflective tape in certain examples include tiny glass spheres mounted on a media so as to provide the limited phase-conjugate mirror affect.

In the preferred embodiment of the present invention, an emulsion is placed in contact with a phase-conjugate mirror. Preferably, the photographic emulsion is as thick as several wave lengths of the light used to illuminate the object whose image is to be recorded; for example, several millimeters such as typically used in phase holography gelatins. In this manner, a clear interference pattern is exposed in the emulsion, since light reflected from the object passes through the emulsion and is reflected off the phase-conjugate mirror directly back along its original path so as to interfere with the incoming light. Accordingly, the image recorded in the emulsion is the interference pattern formed by the incoming light beam and the reflected light beam. Preferably the thick film emulsion will be of a high resolution.

In the preferred embodiment, the phase-conjugate mirror is made up of a myriad of individual three corner reflector elements, having a size on the order of a few microns, such that the size of each reflector is on the order of the desired resolution in the final image and such that the light rays will traverse the path in the emulsion from which they came.

In the preferred embodiment of the present invention, a lens is not utilized thereby further simplifying the apparatus and method.

While in some embodiments of the present invention a laser may be used, it is expected that the greatest advantages of the present invention will come from the use of diffuse white light. Since each incoming beam is in effect its own reference beam, the color recorded in the emulsion will depend on the color of the incoming beam. This in turn will depend on the color of the object from which it was reflected, whereby a true color image, in addition to a three-dimensional image, of the object is recorded.

In one embodiment of the present invention, the three-dimensional image recorded is viewed by shining a diffuse white light through the developed emulsion from the front side thereof, such as a slide might be projected. Unlike a slide; however, the viewer looks at the emulsion directly from the back side. The interference pattern exposed in the emulsion will filter out all light frequencies other than those appropriate to the image originally exposed in it. Accordingly, a true three-dimensional image of the object will be displayed.

In yet another embodiment, light from a diffuse white light source is directed onto the emulsion from the front side and is reflected back through the emulsion by the developed silver inteference filter pattern in the developed emulsion. The viewer views the image created by the interference pattern exposed in the emulsion from the same side of the emulsion as the diffuse white light source.

The advantages and features of novelty which characterize the invention are pointed out with particularity in the claims annexed hereto and forming a part hereof. However, for a better understanding of the invention, its advantages and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

FIG. 3 is a diagrammatic view illustrating transillumination viewing of the developed image in the emulsion;

FIG. 4 is a diagrammatic view illustrating reflection viewing of the developed image in the emulsion; and FIG. 5 is a diagrammatic view of a camera apparatus in accordance with the principles of the present invention.

DETAILED DESCRIPTION OF A PREFERRED EMBODIMENT OF THE PRESENT INVENTION

Figure 1:
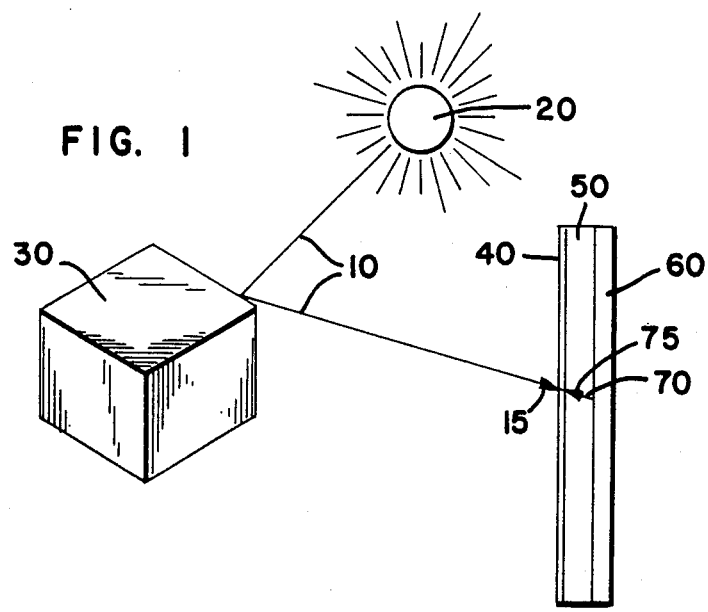
FIG. 1 is a diagrammatic view illustrating diffuse white light being reflected off an object and onto the emulsion/phase-conjugate mirror combination of the present invention.

The detailed description makes reference to FIGS. 1 through 5, in which like reference numerals and letters indicate corresponding parts.

As diagrammatically illustrated in FIG. 1, light beams 10, of which only one is illustrated, from a diffuse white light source 20 such as a light bulb strike a three-dimensional object 30. The light beam 10 is reflected from the object 30 and continues on to pass through a transparent emulsion support, or film 40, as illustrated by the arrow 15 and through a photographic emulsion 50 which is in contact with a phase-conjugate mirror 60. Upon passing through the photographic emulsion 50, the incident light beam 10 strikes the phase-conjugate mirror 60 and is reflected as a light beam 70 directly back along its original path, as generally represented by the arrow 75.

It will be appreciated that the phase-conjugate mirror used might be any of several types. Preferably the phase-conjugate mirror is made up of a myriad of three corner reflectors such that the size of each reflector is on the order of the desired resolution of the final image and such that the light rays will traverse the path in the emulsion from which they came. The individual reflectors might have a size on the order of a few microns and might be crystals imprinted in a suitable substrate such as a plastic composition. Another possibility is a phase-conjugate mirror constructed and arranged similar to commercially available reflective tape; however, modified to provide the desired resolution and color.

Figure 2:
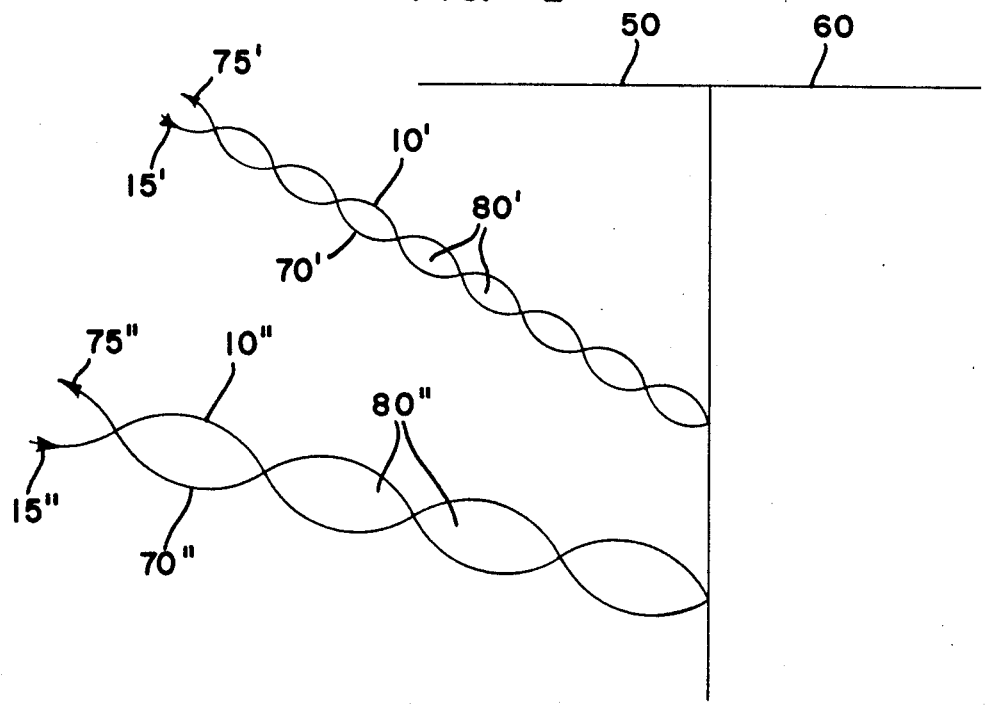
FIG. 2 is a diagrammatic view illustrating the interference pattern formed by two rays of incoming light reflected off the object and their corrresponding outgoing rays after being reflected off the phase-conjugate mirror.

The wave interactions of the incident light beam 10 and the reflected light beam 70 are diagrammatically illustrated in FIG. 2 wherein two different incident light beams having different angles of incidence and different wave lengths are represented by the wave forms 10' and 10" and their corresponding reflected light beams are represented by the wave forms 70' and 70". The incident wave forms 10' and 10" interfere with their corresponding reflected wave forms 70' and 70" so as to create resultant interference patterns or standing wave forms 80' and 80", respectively. (In the illustration, the wave form 80' might represent blue light and the wave form 80" might represent red light.) The electric fields of the light beams set up the standing wave forms 80' and 80" in the emulsion 50 thereby exposing the emulsion 50 so as to create a phase filter which when developed will pass only light beams of like frequency (color) and direction. Accordingly, the emulsion 50 is exposed in proportion to these resulant standing wave forms 80' and 80" rather than in proportion to either of the incident wave forms 10' or 10" or the reflected wave forms 70' or 70", individually.

Once so exposed, the emulsion 50 is developed in the usual fashion utilizing any one of the commonly known techniques for developing emulsions. Preferably, the emulsion is of the type which will not shrink during the developing process or a process is utilized which will not shrink the emulsion such that the colors are not distorted by the emulsions shrinking in size.

Illustrated in FIG. 3, is a preferred method for viewing the resultant three-dimensional or holographic image. In this image, the developed emulsion is viewed in a manner similar to conventional holography. The phase-conjugate mirror 60 is removed from the emulsion 50 either before or after developing the emulsion. Diffuse light 150 from a light source 160, which once again may, but need not, be the same as the light source 20, illuminates the developed emulsion, referred to in its developed state by reference numeral 100 from the front side of the emulsion 100. The viewer 130 views the emulsion from the backside. In this method, some of the light 150 passes directly through the developed emulsion 100, as indicated by arrows 170, and toward the viewer's eyes 130. The developed emulsion 100, will in a fashion similar to that of a normal slide, filter out all light other than the interference pattern which has been developed in it so as to provide the viewer 130 with a true color, three-dimensional image. This type of viewing is referred to herein as transillumination viewing.

Illustrated in FIG. 4, is an alternate method of viewing wherein diffuse white light from a light source 90, which may, but need not, be the same as the light source 20, is shown through the previously developed emulsion 100. The light source 90 is positioned in front of the emulsion 100. Some of the light from the light source 90 strikes the emulsion 100 as illustrated by arrows 120 and is reflected back through the emulsion 100 by the developed interference filter pattern in the emulsion as illustrated by the arrows 125 to the viewer 130 or some other suitable apparatus for magnification or minification. Since this interference pattern contains the three-dimensional information necessary for a holographic image, the filtered light transmitted to the viewer will correspond to this three-dimensional image; however, the complementary colors will be reflected and the image will be minified. This type of viewing is referred to herein as reflecting viewing.

It will be appreciated that yet alternate methods of viewing the developed emulsion might be derived. While the phase-conjugate mirror is preferably removed from the developed emulsion 100, the phase-conjugate mirror might be left attached to the emulsion 100 during various viewing methods.

In the preferred embodiment of the invention, the emulsion 50 is as thick as several wave lengths of the light source 20 such that a well developed interference will be formed within the emulsion 50. For example, it is anticipated that a thickness of a few millimeters or so might be used. Preferably, diffuse white light will be utilized as the light source 20; however, other light sources such as a laser might be utilized.

Diagrammatically, illustrated in FIG. 5, is a camera apparatus in accordance with the present invention. The camera apparatus is diagrammatically shown as including a housing 200 for retaining the emulsion 50 and the phase-conjugate mirror 60. The emulsion 50 is positioned immediately in front of and in contact with the phase-conjugate mirror 60. Positioned in front of the emulsion 50 is the transparent emulsion carrier or film 40 for retaining the emulsion 50 in position. Located at the front of the camera housing 200 is a shutter apparatus 220 mounted on a front side 210 of the camera which provides for exposure of the emulsion 50 to the light 10 from the light source 20 reflected off the object 30. The shutter apparatus 220 might be an electronic apparatus. It will be appreciated that the shutter apparatus 220 will be activated and controlled by any of several well known methods to enable a predetermined exposure of the emulsion 50 to the reflected light. While in certain embodiments, electronic shutters might be utilized, in yet other embodiments, polarizing screens might be utilized. The light source 20 might utilize a strobe light for illumination of the object 30. The emulsion 50 preferably requires a rather long exposure; for example, a one or two minute exposure time being required, although this may vary depending on the emulsion used. In the preferred embodiment, the emulsion support 40 might be a glass plate coated with an antireflective layer to prevent any reflection of the light from the surface of the emulsion support 40.

It is to be understood, that even though numerous characteristics and advantages of the invention have been set forth in the foregoing description, together with details of the structure and function of the invention, the disclosure is illustrative only, and changes made be made in detail, especially in matters of shape, size, and arrangement of parts within the principles of the invention, to the full extent indicated by the broad general meaning of the terms in which the appended claims are expressed.

What is claimed is:

1. An apparatus for recording a three-dimensional image of an object illuminated by a light source, comprising:
   (a) a housing having a front end and a back end;
   (b) an emulsion;
   (c) phase-conjugate mirror means for reflecting light directly back on its original path of incidence, said emulsion and said phase-conjugate mirror means supported within said housing, said emulsion being juxtaposed with said phase-conjugate mirror means, and being positioned in front of said phase-conjugate mirror means between the front end of said housing and said phase-conjugate mirror means;
   (d) means for retaining said emulsion in contact with said phase-conjugate mirror means; and
   (e) shutter means positioned proximate the front end of said housing for exposing said emulsion to the illuminated object for a predetermined period of time.

2. An apparatus in accordance with claim 1, wherein the thickness of said emulsion is at least several times the wavelength of the light source being utilized to illuminate the object.

3. An apparatus in accordance with claim 1, wherein said phase-conjugate mirror means is permanantly mounted in said housing, said emulsion being removable from said housing.

4. An apparatus in accordance with claim 1, wherein said retaining means includes a glass plate, onto which said emulsion is coated as with typical glass plate backed emulsions.

5. An apparatus in accordance with claim 1, wherein said retaining means is positioned in front of said emulsion, said emulsion being positioned between said retaining means and said phase-conjugate mirror means, said retaining means being transparent to enable light to pass therethrough.

6. An apparatus in accordance with claim 5, wherein said transparent retaining means includes anti-reflective means for preventing reflection of light from said retaining means.

7. An apparatus in accordance with claim 1, wherein the phase-conjugate mirror means includes a myriad of corner reflectors such that the size of each reflector is on the order of a desired resolution in the final image, said corner reflectors being oriented such that light is reflected directly back on its original path of incidence.

8. A method for recording a three-dimensional-like image comprising the steps of:
   (a) illuminating with a light source an object whose image is to be recorded;
   (b) transmitting light reflected off the object through a photographic emulsion;
   (c) reflecting said light directly back through said emulsion on its original path of incidence by use of phase-conjugate mirror means; and
   (d) developing said photographic emulsion.

9. A method according to claim 8, wherein the light is reflected from said conjugate mirror means made from corner reflectors which reflect light directly back through said emulsion on its original path of incidence, the size of each corner reflector being on the order of a desired resolution in the final image.

10. A method according to claim 8, wherein said emulsion is exposed to the light reflected off the object for sufficient time duration such that a portion of said light is passing through said emulsion in a first direction at the same time that another portion of said light having previously passed through said first direction and reflected off said phase-conjugate mirror means, is passing through said emulsion for a second time in a second direction substantially anti-parallel to said first direction.

11. A method according to claim 8, wherein the light is transmitted through said emulsion having a thickness which is several times the wavelength of the light from said light source.

12. A method for displaying a three-dimensional-like image comprising:
   (a) reflecting light from a source off an object whose image is to be recorded;
   (b) passing said light through a photographic emulsion having a front side and a back side;
   (c) reflecting said light directly back on its original path through said emulsion by use of phase-conjugate mirror means juxtaposed with the back side of said photographic emulsion;
   (d) developing said photographic emulsion to create a developed photographic emulsion; and
   (e) viewing said developed photographic emulsion by illuminating said developed photographic emulsion, said developed photographic emulsion passing only light of frequency and direction similar to the light which previously exposed said photographic emulsion so as to generate a three-dimensional image.

13. A method in accordance with claim 12, wherein said developed photographic emulsion is removed from said phase-conjugate mirror means prior to viewing, a light for viewing purposes being positioned in front of said developed photographic emulsion.

14. A method in accordance with claim 12, wherein said phase-conjugate mirror means is made up of a myriad of reflectors which reflect light back on its original path through said emulsion.

15. A camera apparatus, comprising:
   (a) a housing having a front end and a back end, said front end including an aperture for admitting light from an object;
   (b) a photosensitized emulsion mounted on a transparent emulsion support means proximate the back end of said housing;
   (c) phase-conjugate mirror means juxtaposed with said emulsion and positioned between said emulsion and the back end of the housing;
   (d) shutter means interconnected to said housing proximate the front end thereof for opening and closing the aperture to selectively expose said emulsion; and
   (e) means for controlling said shutter means.

* * * * *